US005752102A

United States Patent [19]

Matsui et al.

[11] Patent Number: 5,752,102

[45] Date of Patent: May 12, 1998

[54] ELECTRONIC FLASHING DEVICE

[75] Inventors: Hideki Matsui, Yokohama; Hiroshi Sakamoto, Kawasaki; Ryotaro Takayanagi, Yokosuka; Nobuyoshi Hagiuda, Yokohama, all of Japan

[73] Assignee: Nikon Corporation, Tokyo, Japan

[21] Appl. No.: 488,463

[22] Filed: Jun. 7, 1995

Related U.S. Application Data

[63] Continuation of Ser. No. 42,771, Apr. 6, 1993, abandoned.

[30] Foreign Application Priority Data

Apr. 16, 1992 [JP] Japan .............................. 4-024357 U
Apr. 16, 1992 [JP] Japan .............................. 4-096630

[51] Int. Cl.[6] .............................. G03B 15/05

[52] U.S. Cl. .............................. 396/156; 396/159; 396/206

[58] Field of Search .............................. 354/413, 415, 354/416, 417; 396/156, 159, 206

[56] References Cited

U.S. PATENT DOCUMENTS 4,839,686 6/1989 Hosomizu et al. .............................. 354/416
4,951,081 8/1990 Hosomizu et al. .............................. 354/415
5,075,714 12/1991 Hagiuda et al. .............................. 354/416
5,107,292 4/1992 Tanaka et al. .............................. 354/416
5,111,233 5/1992 Yokonuma et al. .............................. 354/416
5,151,762 9/1992 Venishi et al. .............................. 357/23.4
5,159,381 10/1992 Harrison .............................. 354/416
5,180,953 1/1993 Hirata et al. .............................. 354/413
5,187,410 2/1993 Shimizu et al. .............................. 315/241 P
5,250,977 10/1993 Tanaka .............................. 354/413
5,257,063 10/1993 Ishimaru et al. .............................. 354/416

FOREIGN PATENT DOCUMENTS 64-17033 1/1989 Japan .
4-27164 1/1992 Japan .

*Primary Examiner*—Russell E. Adams

[57] ABSTRACT

An electronic flashing device includes a booster circuit for boosting a power supply voltage to a predetermined voltage, a main capacitor charged via the booster circuit, a light emission tube for emitting light according to a charge charged on the main capacitor, a semiconductor element connected in series with the light emission tube, and including a thyristor element and a MOSFET which are cascade-connected to each other, and are formed on a single chip, a trigger circuit for applying a trigger voltage to the light emission tube in response to a light emission start signal for causing the light emission tube to start light emission, a gate voltage applying circuit for applying a voltage to the gate of the semiconductor element in response to the light emission start signal, and a gate voltage disappearing circuit for causing the voltage at the gate of the semiconductor element to disappear in response to a light emission stop signal for causing the light emission tube to stop light emission. A series circuit of the light emission tube and the semiconductor element is connected in parallel with the main capacitor.

5 Claims, 6 Drawing Sheets

ELECTRONIC FLASHING DEVICE

This application is a continuation of application Ser. No. 08/042,771, filed Apr. 6, 1993, now abandoned.

BACKGROUND OF THE INVENTION

1. Field of the Invention

The present invention relates to control of an electronic flashing device and, more particularly, to control of an electronic flashing device using a semiconductor element including a thyristor element and a MOSFET, which are cascade-connected to each other and are formed on a single chip.

2. Related Background Art

As a method of controlling flashing of a conventional electronic flashing device, a light control circuit using thyristors is popularly used. FIG. 3 shows this conventional circuit.

In FIG. 3, resistors 20, 24, and 26, capacitors 21 and 25, a trigger transformer 22, and a thyristor 23 form a known trigger circuit; and a light emission tube 44, resistors 51, 52, 55, 57, 59, and 60, capacitors 53, 54, and 58, and thyristors 50 and 56 form a light emission control circuit including a known commutating circuit.

A light emission start signal input to a TG line, i.e., to the gate of the thyristor 23 enables the trigger circuit. Thus, the light emission tube 44 starts light emission, and the anode-cathode path of the thyristor 50 is enabled.

When a photometry circuit (not shown) detects that the light emission amount of a discharge tube has reached a proper exposure amount of an object, a light emission stop signal is input to an STP line, i.e., to the gate of the thyristor 56 so as to stop light emission of the light emission tube 44.

Since the light emission stop signal enables the anode-cathode path of the thyristor 56, a charge accumulated on the commutating capacitor 54 is discharged in the direction from the anode to the cathode of the thyristor 56, and the anode-cathode path of the thyristor 50 is reversely biased. Thus, the thyristor 50 is disabled, and light emission of the light emission tube 44 is stopped.

However, in the circuit arrangement shown in FIG. 3, when light emission of the light emission tube 44 is stopped by the light emission stop signal, a problem of an increase in light amount due to commutation is posed. Since the charge accumulated on the commutating capacitor 54 is discharged to stop light emission of the light emission tube 44, a charging current for charging the commutating capacitor 54 flows through the light emission tube 44 even after the light emission stop signal is input.

Therefore, over-exposure occurs due to this charging current. This influence conspicuously appears as the photographing distance becomes shorter or as the film sensitivity becomes higher.

A large number of techniques associated with a light emission control circuit for an electronic flashing device using a voltage-operated switch element IGBT (Insulated Gate Bipolar Transistor), ESC (Emitter Shorted Collector)) are known (e.g., Japanese Laid-Open Patent Application Nos. 64-17033, 4-27164, and the like).

However, according to these techniques, the voltage-operated switch element is enabled in response to a light emission start signal upon light emission of a light emission tube, and is disabled in response to a light emission stop signal. For this reason, when, for example, more than one of photographing conditions ① the distance to an object is very short, ② a film used in a photographing operation has a high sensitivity, ③ the aperture value of a photographing lens is set at the full-aperture side, ④ an object luminance is high, ⑤ light emission is repetitively performed at high speed, and the like, occur concurrently, the object luminance may become a proper light amount almost simultaneously with light emission of the electronic flashing device. At this time, the light emission stop signal is output immediately after the light emission start signal is output.

However, a slight time interval is required until a voltage applied to the gate of the voltage-operated switch element reaches a predetermined-gate voltage since the gate-emitter path of the voltage-operated switch element has a capacitance.

Therefore, when the light emission stop signal is output immediately after the light emission start signal, the voltage applied to the gate of the voltage-operated switch element may disappear before it reaches a predetermined gate voltage. At this time, since the excitation state of the light emission tube continues, the impedance of the light emission tube has become very small.

The voltage-operated switch element has a predetermined maximum collector current according to the gate current in consideration of its characteristics. However, when the impedance of the light emission tube is very small, the collector current of the voltage-operated switch element flows irrespective of the gate voltage.

As a result, the collector current flows beyond the withstand voltage of the voltage-operated switch element, and the voltage-operated switch element may be destroyed.

SUMMARY OF THE INVENTION

It is an object of the present invention to provide an electronic flashing device, which can prevent an over-exposure state in a flash photographing mode.

It is another object of the present invention to provide a control circuit for an electronic flashing device, which inhibits a light emission stop signal for a predetermined period of time after a light emission start signal is output, and inhibits a light emission start signal for a predetermined period of time after a light emission stop signal is output, thereby preventing a voltage-operated switch element from being destroyed.

In order to achieve the above objects, an electronic flashing device according to the present invention comprises a semiconductor element connected in series with a light emission tube and including a thyristor element and a MOSFET, which are cascade-connected to each other, and are formed on a single chip, a trigger circuit for applying a trigger voltage to the light emission tube in response to a light emission start signal for causing the light emission a tube to start light emission, gate voltage applying circuit for applying a voltage to a gate of the semiconductor element in response to the light emission start signal, and a gate voltage disappearing circuit for causing the voltage applied to the gate of the semiconductor element to disappear in response to a light emission stop signal for causing the light emission tube to stop light emission, wherein a series circuit of the light emission tube and the semiconductor element is connected in parallel with a main capacitor.

In the electronic flashing device of the present invention, the semiconductor element is enabled by applying a voltage to its gate in response to the light emission start signal, thus causing the light emission tube to start light emission. The semiconductor element is disabled by causing the voltage applied to the gate of the semiconductor element to disappear in response to the light emission stop signal, thus causing the light emission tube to stop light emission.

Furthermore, before the semiconductor element is driven, a voltage is applied to the gate of the semiconductor voltage so as to prevent the semiconductor element from being destroyed.

A light emission control circuit for an electronic flashing device of the present invention comprises a circuit for inhibiting a light emission stop signal for a predetermined period of time after a light emission start signal is output, and circuit for inhibiting a light emission start signal for a predetermined period of time after a light emission stop signal is output.

A light emission stop signal is inhibited after a light emission start signal is output until the gate voltage of the voltage-operated switch element reaches a predetermined voltage. Also, a light emission start signal is inhibited after a light emission stop signal is output until the gate voltage of the voltage-operated switch element is caused to completely disappear. For this reason, even when light emission is repetitively executed at high speed, the voltage-operated switch element can be prevented from being destroyed.

DESCRIPTION OF THE PREFERRED EMBODIMENTS

Figure 1:
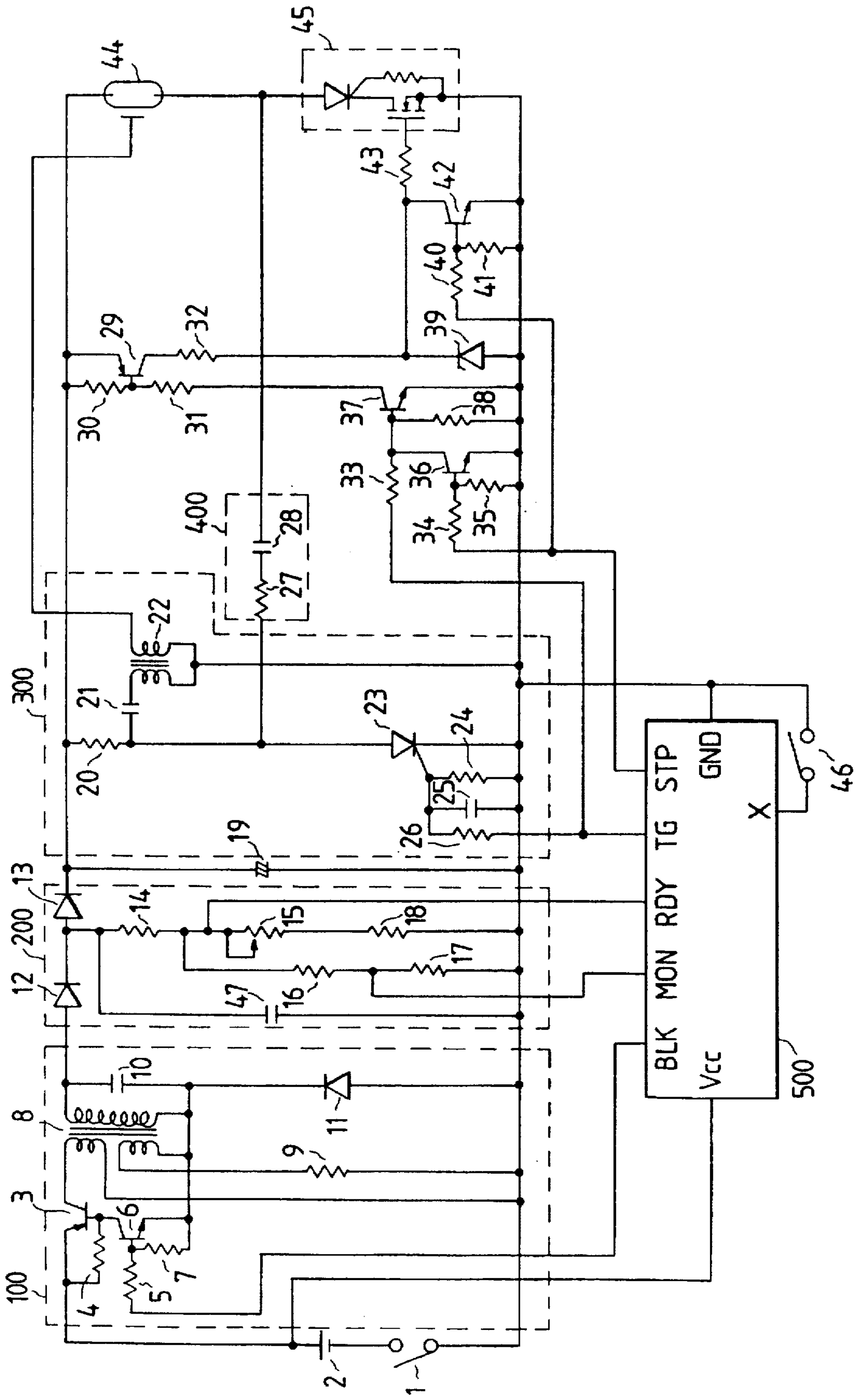
FIG. 1 is a circuit diagram of an electronic flashing device according to a first embodiment of the present invention.

FIG. 1 shows a first embodiment of the present invention.

In FIG. 1, a power supply 2 is connected to the emitter of a booster transistor 3 and a power supply line $V_{CC}$ of a control circuit 500 (to be described later).

A booster circuit 100 comprises the booster transistor 3, resistors 4, 5, 7, and 9, a boost control transistor 6, a step-up transformer 8, a capacitor 10, and a diode 11.

A voltage detection circuit 200 comprises diodes 12 and 13, resistors 14, 16, 17, and 18, a variable resistor 15, and a capacitor 47.

A trigger circuit 300 comprises a trigger capacitor 21, a resistor 20 for charging the trigger capacitor 21, a trigger transformer 22, a trigger thyristor 23, resistors 24 and 26, and a capacitor 25.

A main capacitor. 19 for storing light emission energy is connected between the voltage-detection circuit 200 and the trigger circuit 300.

One terminal of a voltage doubling circuit 400 comprising a resistor 27 and a capacitor 28 is connected to the node between the anode of the thyristor 23 and the resistor 20 in the trigger circuit 300, and the other terminal of the voltage doubling circuit 400 is connected to a light emission tube 44 and the anode of a thyristor element of a semiconductor element 45. The voltage doubling circuit 400 applies a voltage about twice a terminal voltage of the main capacitor 19 to the light emission tube 44.

A semiconductor element 45 includes the thyristor element and a MOSFET, which are cascade-connected to each other, and are formed on a single chip. Note that the details of the structure of the semiconductor element 45 are described in Japanese Laid-Open Patent Application No. 4-27164, and a detailed description thereof will be omitted here.

The gate of the MOSFET of the semiconductor element 45 is connected, through a resistor 43, to the node between a Zener diode 39 and a resistor 32, and the collector of a transistor 42.

The resistor 32 is connected to the collector of a transistor 29, and the base of the transistor 29 is connected to resistors 30 and 31. The resistor 31 is connected to the collector of a transistor 37, and the base of the transistor 37 is connected to a TG terminal of the control circuit 500 (to be described later) via a resistor 33. These elements constitute a circuit for applying a gate voltage for enabling the semiconductor element 45.

The base of the transistor 42 is connected to an STP terminal of the control circuit 500 via a resistor 40. In addition to the base of the transistor 42, the STP terminal of the control circuit 500 is also connected to the base of a transistor 36 via a resistor 34. These elements constitute a gate voltage disappearing circuit for disabling the semiconductor element 45.

The control circuit 500 is a circuit for controlling the operation of the entire electronic flashing device of this embodiment, and has a BLK terminal for controlling a boost operation of the booster circuit 100, an RDY terminal for detecting a charging voltage of the main capacitor 19, an MON terminal for detecting a voltage for stopping charging to the main capacitor 19, an X terminal for reading the state of a start switch 46, the TG terminal for outputting a light emission start signal in response to a closing operation of the start switch 46, the STP terminal for outputting a light emission stop signal for causing the light emission tube 44 to stop light emission upon reception of a signal from, e.g., a photometry circuit (not shown), the power supply line $V_{CC}$, and a GND terminal as a reference potential.

The operation of the electronic flashing device with the above-mentioned arrangement is as follows.

When a power switch 1 is closed, a voltage from the power supply 2 is applied to a $V_{CC}$ terminal of the control circuit 500, and the BLK terminal outputs a "High"-level signal. This signal is applied to the base of the boost control transistor 6 via the resistor 5, and the collector-emitter path of the transistor 6 is enabled. Thus, the booster transistor 3 starts its operation, and the booster circuit 100 starts a known boost operation.

A current boosted by the booster circuit 100 is charged on the main capacitor 19 via the diodes 12 and 13, and is also charged on the capacitor 47 of the voltage detection circuit 200. The charged voltage is voltage-divided by a series resistor circuit of the resistors 14, 16, 17, and 18, and the variable resistor 15, and the divided voltage is input to the RDY and MON terminals of the control circuit 500, thus always monitoring the voltage of the main capacitor 19. The RDY terminal for detecting the charging voltage picks up a voltage from the node between the resistor 14 and the variable resistor 15, and the MON terminal for detecting the voltage for stopping charging to the main capacitor 19 picks up a voltage from the node between the resistors 16 and 17.

When the main capacitor 19 is charged to a predetermined voltage, the control circuit 500 sets the output from the BLK terminal at "Low" level according to a signal input from the MON terminal. Thus, the booster circuit 100 stops the boost operation.

Even after the boost operation of the booster circuit 100 is stopped, the circuit is designed not to discharge the charge on the main capacitor 19, thus providing a great energy saving effect for an electronic flashing device using, e.g., a battery.

When the start switch 46 is closed after the main capacitor 19 is charged to the predetermined voltage, the X terminal is short-circuited, and a light emission start signal is output from the TG terminal.

The light emission start signal is input to the gate of the trigger thyristor 23 via the resistor 26. In response to this signal, the trigger circuit 300 operates to induce a high voltage from the secondary winding side of the trigger transformer 22, thus causing the light emission tube 44 to emit light.

At the same time, the voltage doubling circuit 400 applies a voltage about twice the terminal voltage of the main capacitor 19 to the light emission tube 44. Furthermore, the light emission start signal is applied to the base of the transistor 37 via the resistor 33, and the collector-emitter path of the transistor 37 is enabled. Thus, the signal is also applied to the base of the transistor 29 through the resistor 31, and the collector-emitter path of the transistor 29 is enabled as well. As a result, a voltage generated by the Zener diode 39 is applied from the main capacitor 19 to the gate of the semiconductor element 45 via the resistor 32, the anode-cathode path of the semiconductor element 45 is enabled, and the light emission tube 44 starts light emission.

Thereafter, the photometry circuit (not shown) detects that a proper exposure amount of an object is obtained upon light emission of the light emission tube 44, and supplies the detection signal to the control circuit 500. The control circuit 500 outputs a light emission stop signal from the STP terminal.

When the light emission stop signal is input to the base of the transistor 36 via the resistor 34, the collector-emitter path of the transistor 36 is enabled. As a result, the base voltage of the transistor 37 is extracted, the collector-emitter path of the transistor 37 is disabled, and the base voltage of the transistor 29 becomes an open voltage, thereby disabling the collector-emitter path of the transistor 29.

When the light emission stop signal is input to the base of the transistor 42 through the resistor 40, the collector-emitter path of the transistor 42 is also enabled. Therefore, the gate voltage of the semiconductor element 45 is extracted, and the anode-cathode path of the semiconductor element 45 is disabled, thus stopping light emission of the light emission tube 44.

The reason why the control circuit 500 stops light emission of the light emission tube 44 using the transistor 42, and also stops the light emission start signal using the transistor 36 is to assure that the transistor 37 is quickly disabled by the transistor 36 since the transistor 37 cannot often be instantaneously turned off in synchronism with the light emission stop signal due to, e.g., the capacitance of its base-emitter path.

Figure 2:
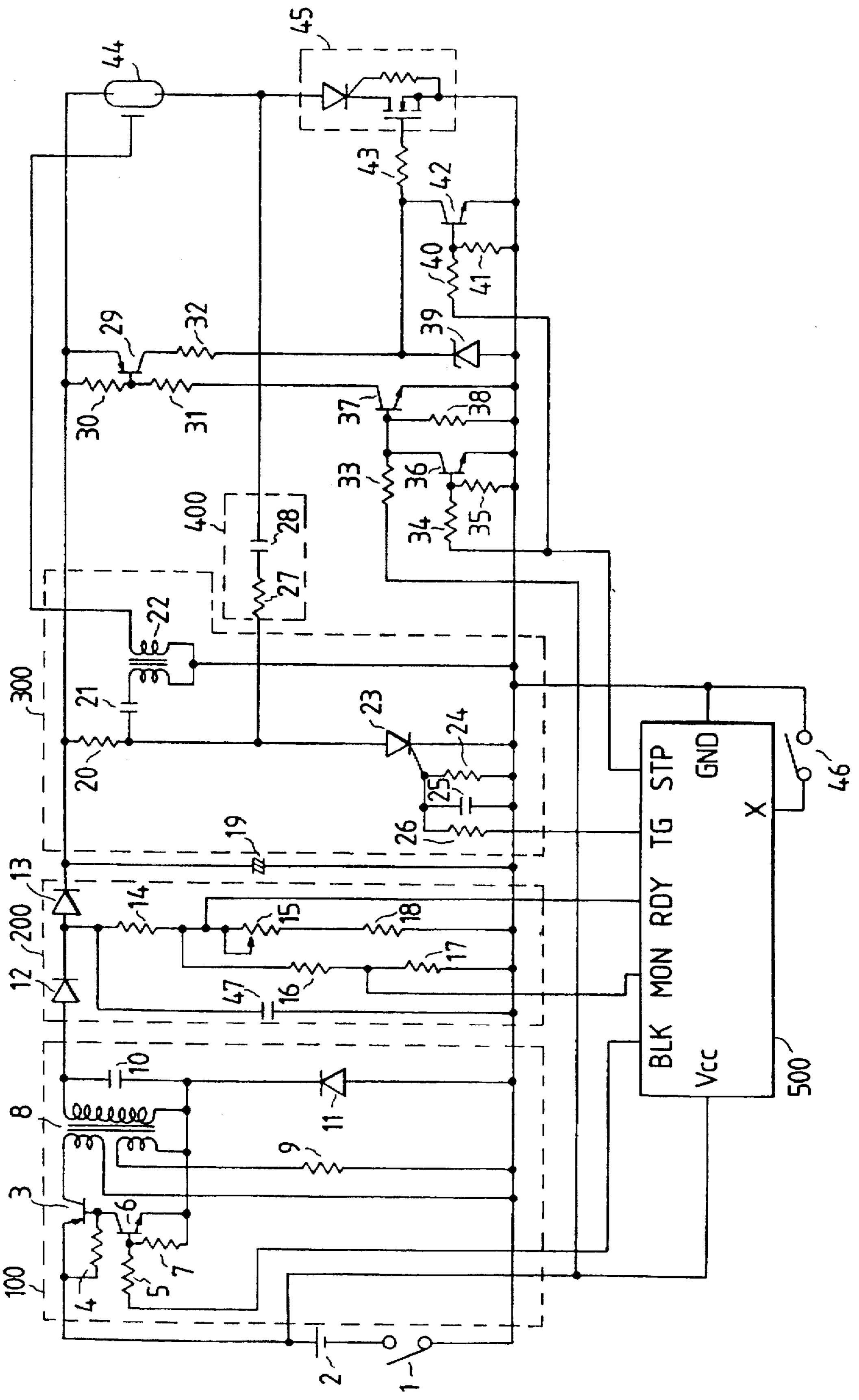
FIG. 2 is a circuit diagram of an electronic flashing device according to a second embodiment of the present invention.
Figure 3:
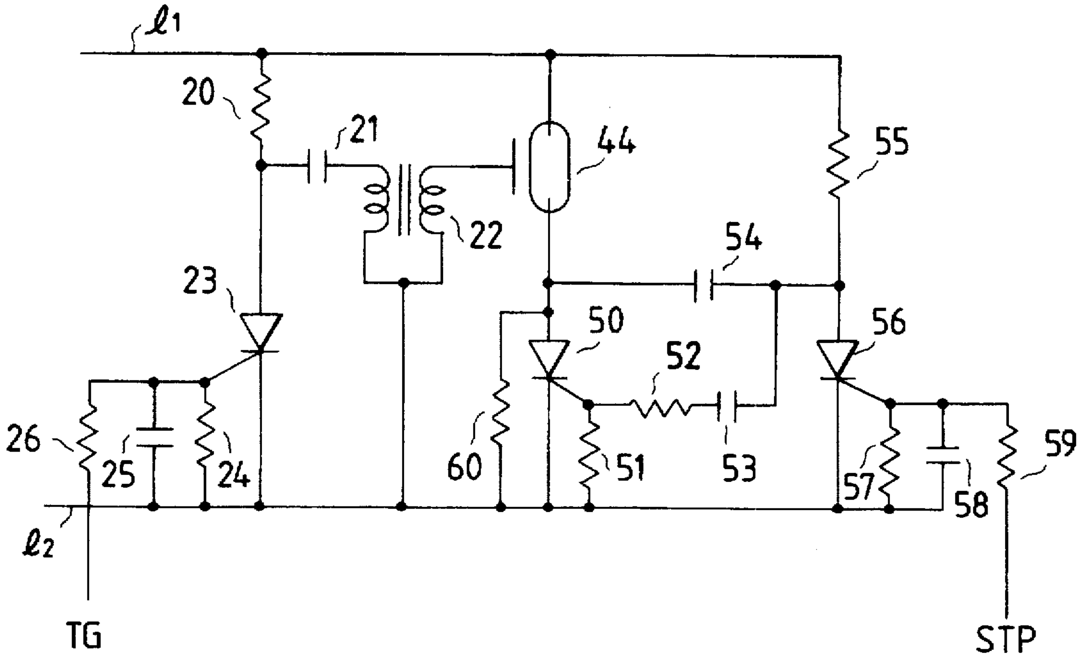
FIG. 3 PRIOR ART
FIG. 3 is a circuit diagram showing a conventional light emission control circuit (commutating circuit) using thyristors.

FIG. 2 shows the second embodiment of the present invention.

Circuit symbols in FIG. 2 are the same as those in FIG. 1, except for a connecting portion of a signal line for applying a gate voltage to the semiconductor element 45.

In FIG. 1, the base line for enabling the transistor 37 is connected to the TG terminal of the control circuit 500 via the resistor 33. However, in this embodiment, the base line is connected to the $V_{cc}$ line. Other arrangements are the same as those in FIG. 1.

More specifically, this circuit is designed to apply a gate voltage to the semiconductor element 45 in response to a power switch 1. For this reason, when a trigger voltage is applied to a light emission tube 44, the anode-cathode path of the semiconductor element 45 has already been enabled.

The operation of the electronic flashing device with the above-mentioned arrangement is as follows.

When the power switch 1 is closed, a voltage is applied to a control circuit 500, and a BLK terminal outputs a "High"-level signal. This signal is applied to the base of a boost control transistor 6 via a resistor 5, and the collector-emitter path of the transistor 6 is enabled. Thus, a booster transistor 3 starts its operation, and a booster circuit 100 starts a known boost operation.

At the same time, a circuit for generating a gate voltage to the semiconductor element 45 starts its operation. More specifically, since a $V_{CC}$ voltage is applied to the base of a transistor 37 via a resistor 33 in response to the closing operation of the power switch 1, the emitter-collector path of the transistor 37 is enabled, and the emitter-collector path of a transistor 29 is enabled accordingly. The gate of the semiconductor element 45 is applied with a voltage generated by a Zener diode 39, thus enabling the anode-cathode path of the semiconductor element 45.

A current boosted by the booster circuit 100 is charged on a main capacitor 19 via diodes 12 and 13, and is also charged on a capacitor 47. This voltage is voltage-divided by a series resistor circuit of resistors 14, 16, 17, and 18, and a variable resistor 15, and the divided voltage is input to the control circuit 500, thus always monitoring the voltage of the main capacitor 19.

When the main capacitor is charged up to a predetermined voltage by these elements, the control circuit 500 sets an output from the BLK terminal at "Low" level according to a signal input from an MON terminal. Thus, the booster circuit 100 stops the boost operation.

Other operations are the same as those in the first embodiment described above.

Note that this circuit is designed such that the control circuit 500 stops the output of a light emission start signal before at least a light emission stop signal is output. Even when a light emission stop signal is output almost simultaneously with a light emission start signal (e.g., when the photographing distance is a close distance, the aperture value of a photographing lens is set at a full-aperture side, and a high-sensitivity film is used), the light emission start signal is stopped in response to the light emission stop signal, as a matter of course.

As described above, according to the present invention, since light emission of the light emission tube is started/stopped by only enabling/disabling the semiconductor element, a commutating capacitor can be omitted unlike in a conventional device, and an increase in light amount caused by commutation can be eliminated. As a result, a problem associated with an over-exposure state can be solved.

Since a commutating circuit can be omitted, the device can be rendered compact, and high-speed repetitive emission, which is difficult for the commutating circuit, can be easily realized.

Furthermore, since the semiconductor element 45 is enabled before light emission of the light emission tube 44, the semiconductor element 45 can be prevented from being destroyed due to a low gate voltage.

Figures 4A, 4B:
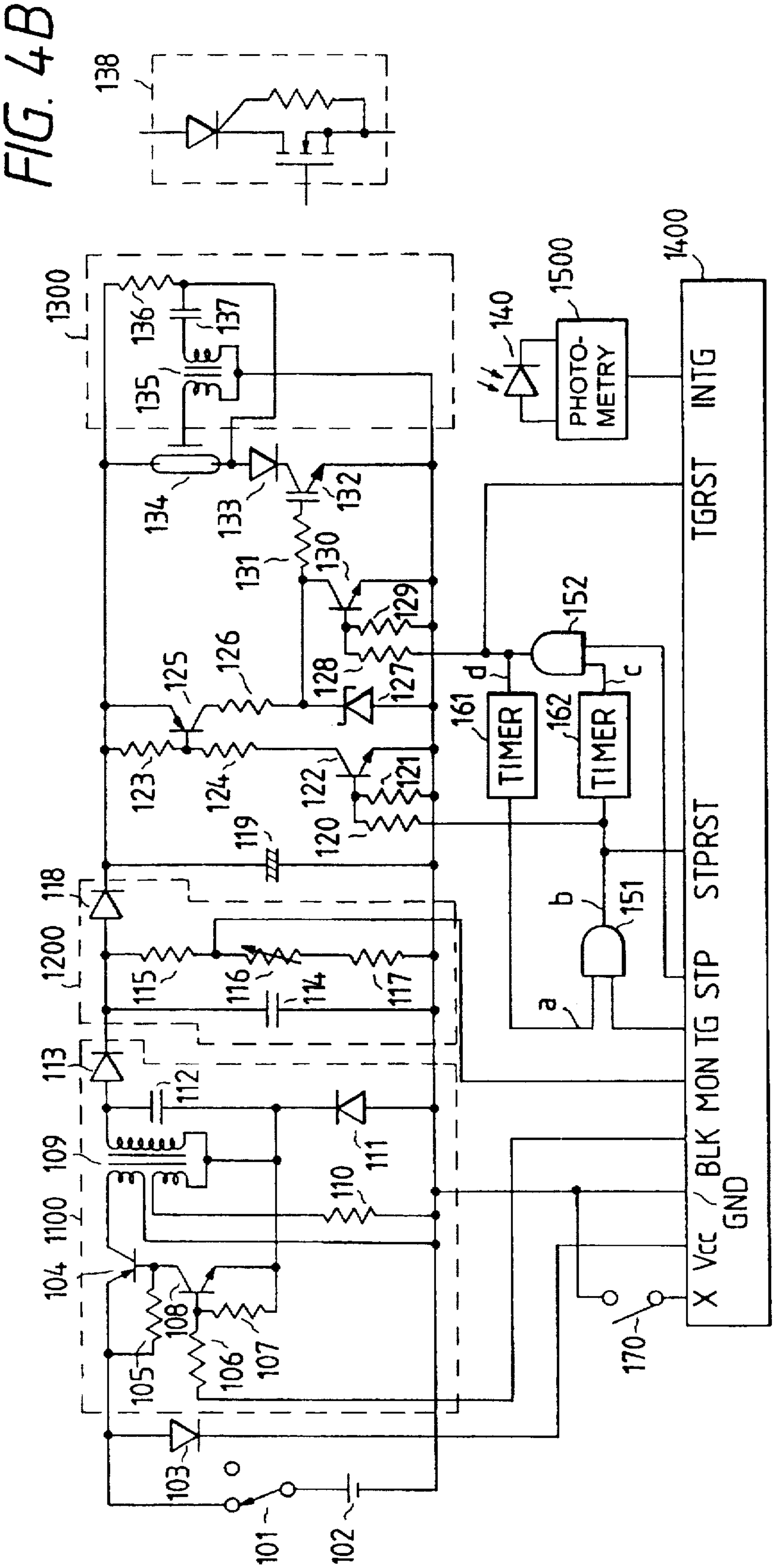
FIGS. 4A and 4B are circuit diagrams showing still another embodiment of the present invention.

FIG. 4A is a circuit diagram of still another embodiment of the present invention. In this embodiment, an insulated gate bipolar transistor (IGBT) is used.

In FIG. 4A, a power supply 102 is connected to the emitter of a booster transistor 104 and a power supply line $V_{CC}$ of a control circuit 1400 (to be described later).

A booster circuit 1100 comprises the booster transistor 104, resistors 105, 106, 107, and 110, a boost control transistor 108, a step-up transformer 109, diodes 111 and 113, and a capacitor 112.

A voltage detection circuit 1200 comprises a voltage detection monitor capacitor 114, resistors 115 and 117, a variable resistor 116, and a diode 118.

A main capacitor 119 stores a charge for causing a light emission tube 134 to emit light, and a voltage boosted by the booster circuit 1100 is charged on the main capacitor 119.

A trigger circuit 1300 comprises a trigger capacitor 137, a charging resistor 136 for charging the trigger capacitor 137, a trigger transformer 135, an IGBT 132, a resistor 131, and a diode 133.

The gate of the IGBT 132 is connected to the node between a Zener diode 127 and a resistor 126, and is connected to the collector of a transistor 125 via the resistor 126. The base of the transistor 125 is connected to the node between resistors 123 and 124, and is connected to the-collector of a transistor 122. The base of the transistor 122 is connected to resistors 120 and 121. The Zener diode 127, the transistors 122 and 125, and the resistors 120, 121, 123, and 124 constitute a gate voltage generation circuit for the IGBT 132.

The gate of the IGBT 132 is also connected to the collector of a transistor 130 via the resistor 131, and the transistor 130, and resistors 128 and 129 connected to the base of the transistor 130 constitute a gate voltage disappearing circuit for the IGBT 132.

The control circuit 1400 is a circuit for controlling the operation of the electronic flashing device of this embodiment, and comprises an X terminal as an input terminal of a switch 170 for causing the light emission tube 134 to emit light, a $V_{cc}$ terminal as a power supply, a GND terminal as a reference potential, a BLK terminal as an output terminal for controlling the boost operation of the booster circuit 1100, an MON terminal as an input terminal for monitoring the charging voltage of the main capacitor 119, a TG terminal for outputting a light emission start signal, an STP terminal for outputting a light emission stop signal, an STPRST terminal as an input terminal for monitoring an input so as to interrupt the output of the light emission stop signal, a TGRST terminal as an input terminal for monitoring an input so as to interrupt the output of the light emission start signal, and an INTG terminal for receiving a signal from a photometry circuit 1500 which integrates the amount of light received by a light-receiving element 140 for detecting the brightness of an object.

One input terminal of an AND gate 151 is connected to the TG terminal of the control circuit 1400, and the other input terminal of the AND gate 151 is connected to the output terminal of a timer 161 (to be described later). The output terminal of the AND gate 151 is connected to a timer 162 and the resistor 120, and the STPRST terminal of the control circuit 1400 is connected to the node between the AND gate 151 and the timer 162. The output terminal of the timer 162 is connected to one input terminal of an AND gate 152, and the other input terminal of the AND gate 152 is connected to the STP terminal of the control circuit 1400. The output terminal of the AND gate 152 is connected to the timer 161 and the resistor 128, and the TGRST terminal of the control circuit 1400 is connected to the node between the timer 161 and the resistor 128.

The timer 161 and the AND gate 151 are used for inhibiting a light emission stop signal for a predetermined period of time after a light emission start signal is output, and the timer 162 and the AND gate 152 are used for inhibiting a light emission start signal for a predetermined period of time after a light emission stop signal is output.

The operation of the electronic flashing device of this embodiment with the above-mentioned arrangement will be described below.

When a power switch 101 is closed, a power supply voltage is supplied to the $V_{cc}$ terminal of the control circuit 1400 and the booster circuit 1100, and the BLK terminal of the control circuit 1400 outputs a boost signal ("H" level). The boost signal is input to the base of the boost control transistor 108 via the resistor 106, and the collector-emitter path of the boost control transistor 108 is enabled. Thus, the booster circuit 1100 starts a known boost operation.

The monitor capacitor 114 and the main capacitor 119 are gradually charged by the boost operation of the booster circuit 1100, and the charging voltage is supplied to the MON terminal of the control circuit 1400 by the voltage detection circuit 1200. When the voltage at the MON terminal exceeds a predetermined voltage, the control circuit 1400 stops the output of the boost signal from the BLK terminal ("L", level).

At this time, the trigger capacitor 137 is also charged via the resistor 136 by the boost operation of the booster circuit 1100.

Figure 5:
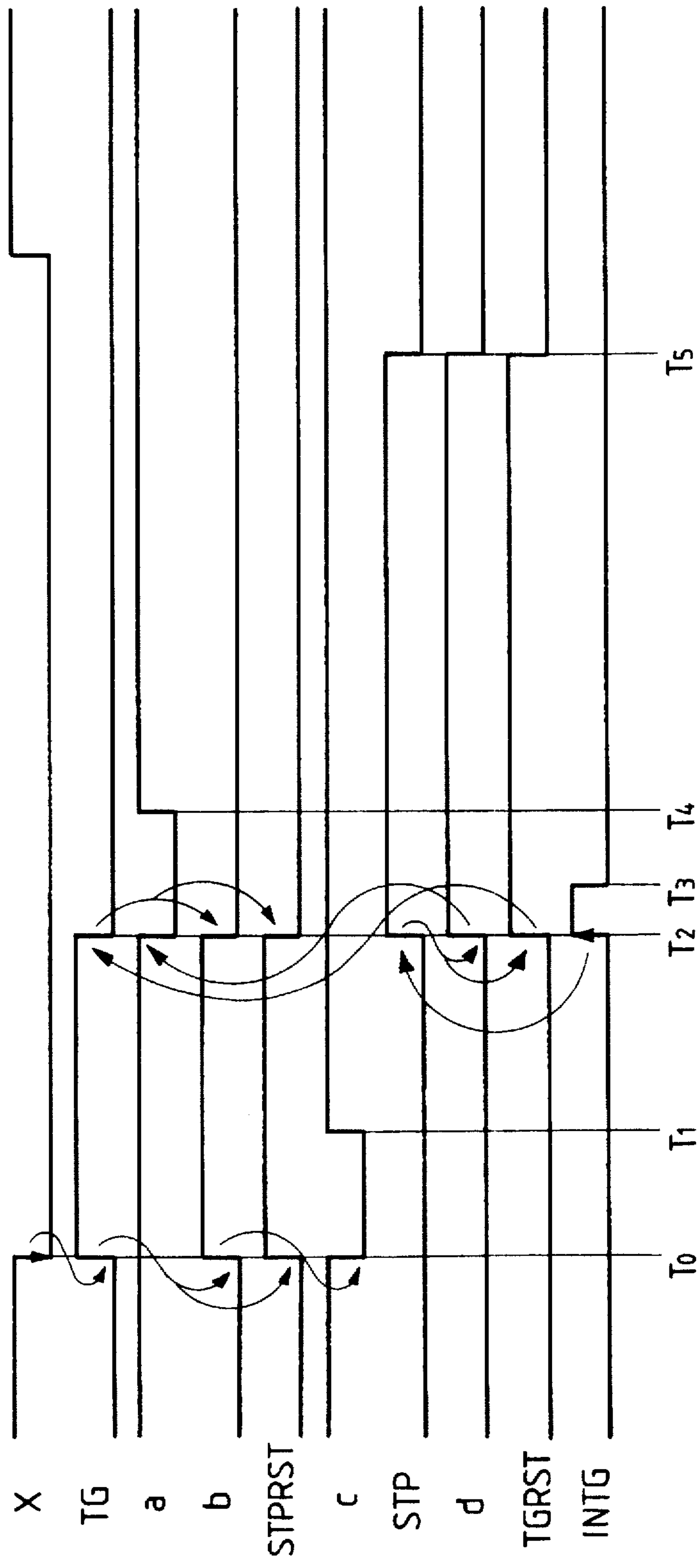
FIG. 5 is a timing chart showing a light emission sequence.

FIG. 5 is a timing chart of a single light emission operation of the electronic flashing device executed when the light emission start switch 170 is closed. Note that X, TG, and the like described at the left end of the chart represent the terminals of the control circuit 1400, and a to d represent the positions indicated by corresponding lines in FIG. 4A. The following description will be made with reference to the timing chart.

When the light emission start switch 170 is closed, this state is input to the X terminal (time $T_o$ in FIG. 5).

The control circuit 1400 outputs a light emission start signal from the TG terminal in response to input (trailing edge) of the X signal. The light emission start signal is input to one input terminal of the AND gate 151, and since the other input terminal a normally outputs an "H"-level signal, the output terminal b of the AND gate 151 and the STPRST terminal of the control circuit 1400 also go to "H" level in response to the output light emission start signal.

The timer 162 is designed to be set in response to the leading edge of an input signal, and its output terminal c outputs an "L"-level signal for a predetermined period of time (a time interval between time $T_0$ and time $T_1$ in FIG. 5 in this embodiment) in response to the leading edge of an input signal.

The light emission start signal is also input to the base of the transistor 122 via the resistor 120. Thus, the collector-emitter path of the transistor 122 is enabled, and the emitter-collector path of the transistor 125 is also enabled. Since the transistor 125 is enabled, a voltage from the main capacitor 119 is supplied to the Zener diode 127 via the resistor 126, and a voltage generated by the Zener diode 127 is applied to the gate of the IGBT 132 via the resistor 131, thus enabling the collector-emitter path of the IGBT 132.

When the IGBT 132 is enabled, the charge on the trigger capacitor 137 is discharged through the diode 133, the collector-emitter path of the IGBT 132, and the primary winding of the trigger transformer 135, and a trigger voltage of several thousands of volts is applied to the light emission tube 134. Thus, the light emission tube 134 starts light emission. Upon light emission of the light emission tube 134, the photometry circuit 1500 starts light amount integration via the light-receiving element 140, and when an object receives a proper light amount, the photometry circuit 1500 outputs a proper signal to the INTG terminal of the control circuit 1400 (a time interval from time $T_2$ to time $T_3$ in FIG. 5).

The control circuit 1400 outputs a light emission stop signal from the STP terminal in response to the input INTG signal. The light emission stop signal is input to one input terminal of the AND gate 152. Since the other input terminal c of the AND gate 152 is already set at "H" level since time $T_1$ has been passed, the output terminal d of the AND gate 152 also goes to "H" level.

This "H"-level signal is input to the base of the transistor 130 via the resistor 128, and the collector-emitter path of the transistor 130 is enabled, thus causing the gate voltage of the IGBT 132 to disappear. Furthermore, the output signal from the AND gate 152 is also input to the TGRST terminal of the control circuit 1400, and the control circuit 1400 stops the output of the light emission start signal from the TG terminal in response to this signal.

The timer 161 starts its operation in response to the leading edge of the output terminal d of the AND gate 152, and its output terminal a outputs an L-level signal for a predetermined period of time (a time interval from time $T_2$ to time $T_4$ in FIG. 5).

The output time interval of the light emission stop signal output from the STP terminal is predetermined by the control circuit 1400, and after an elapse of a predetermined period of time (a time interval from time $T_2$ to time $T_5$ in FIG. 5) has elapsed, the light emission stop signal goes from "H" level to "L" level (time $T_5$ in FIG. 5). The operations in the single light emission mode have been described.

Operations upon execution of high-speed repetitive light emissions will be described below with reference to the timing chart shown in FIG. 6. Since the operations are substantially the same as those described above with reference to FIG. 5, only differences will be explained below.

When the light emission start switch 170 is closed, an "L"-level signal is input to the X terminal, and a light emission start signal is output from the TG terminal in response to this signal. Thus, a predetermined voltage is applied to the gate of the IGBT 132. Also, the timer 162 starts its operation. At the same time, the light emission tube 134 starts light emission, and the photometry circuit 1500 begins to integrate the light emission amount via the light-receiving element 140 in response to the start of light emission of the light emission tube 134. When the light emission amount reaches a predetermined value, the circuit 1500 outputs a proper signal to the INTG terminal. The control circuit 1400 outputs a light emission stop signal from the STP terminal in response to input of the INTG signal (time $T_{11}$ in FIG. 6), and the light emission stop signal is input to one input terminal of the AND gate 152.

Figure 6:
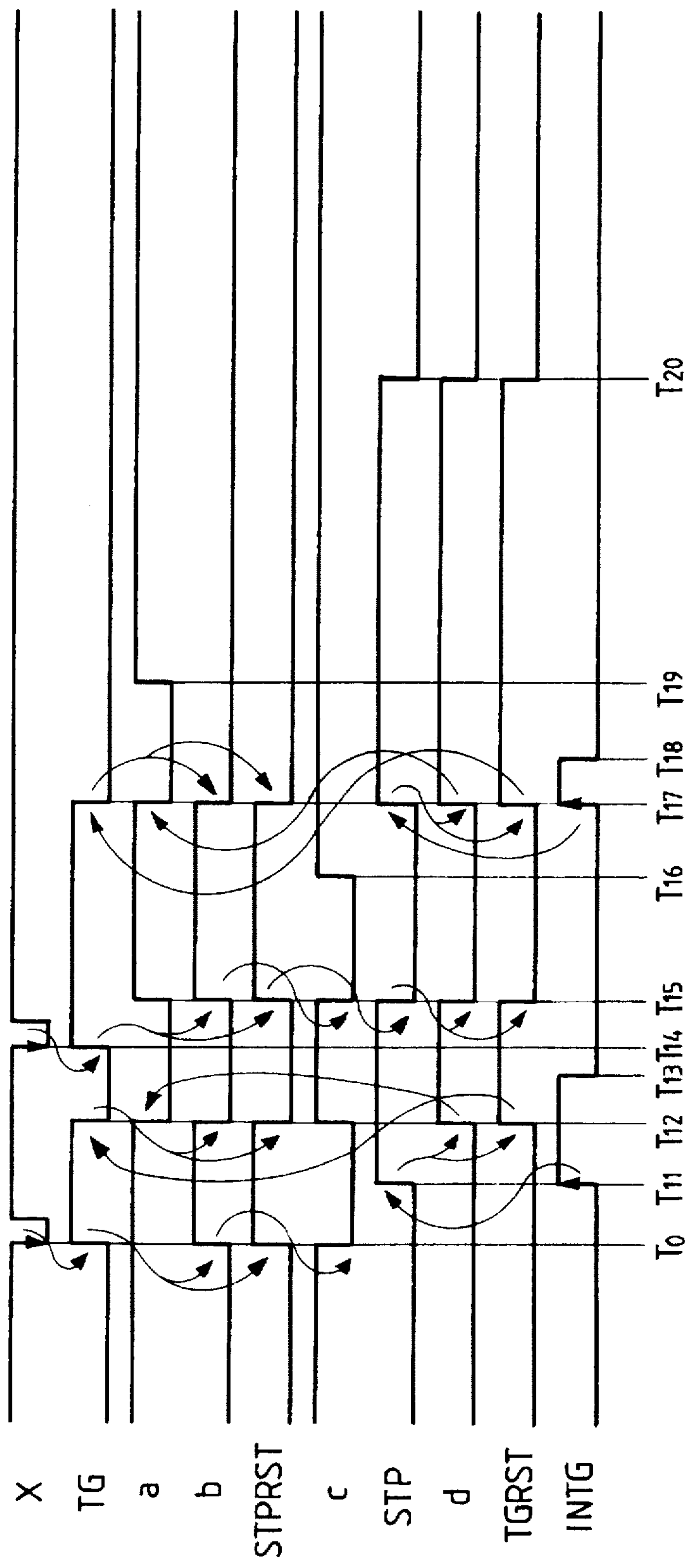
FIG. 6 is a timing chart showing a light emission sequence.

However, since the other input terminal c of the AND gate 152 receives an "L"-level output from the timer 162 (time $T_{11}$ in FIG. 6), the output from the output terminal d of the AND gate 152 is left unchanged until the output from the timer 162 goes to "H" level (time $T_{12}$ in FIG. 6). During this time interval (a time interval from time $T_{11}$ to time $T_{12}$ in FIG. 6), the light emission stop signal is inhibited. Thereafter, the input of the INTG signal is ended (a time interval from time $T_{12}$ to time $T_{13}$ in FIG. 6).

When the output from the output terminal d of the AND gate 152 goes to "H" level (time $T_{12}$ in FIG. 6), this state is also transmitted to the TGRST terminal, and the light emission start signal output from the TG terminal is then stopped. The output from the output terminal a of the timer 161 goes to "L" level for a predetermined period of time (a time interval from time $T_{12}$ to $T_{15}$ in FIG. 6).

When the light emission start switch 170 is closed again during this time interval (time $T_{14}$ in FIG. 6), this state is input to the X terminal, the control circuit 1400 outputs another light emission start signal from the TG terminal, and an "H"-level signal is input to one input terminal of the AND gate 151.

However, in this state, the light emission stop signal is output from the STP terminal (time $T_{11}$ in FIG. 6) and is input to one input terminal of the AND gate 152, and the output from the output terminal a of the timer 161 enabled in response to the "H"-level output from the output terminal d is at "L" level (time $T_{14}$ in FIG. 6). For this reason, the output from the output terminal b of the AND gate 151 is left unchanged until the output from the output terminal a of the timer 161 goes to "H" level (a time interval until time $T_{15}$ in FIG. 6). During this time interval (a time interval from time $T_{14}$ to time $T_{15}$ in FIG. 6), the light emission start signal is inhibited.

When the output from the output terminal a of the timer 161 goes to "H" level, the output from the output terminal b of the AND gate 151 goes to "H" level, and the output from the output terminal c of the timer 162 goes to "L" level for a predetermined period of time (a time interval from time $T_{15}$ to time $T_{16}$ in FIG. 6). Since the input to the STPRST terminal also goes to "H" level, the light emission stop signal output from the STP terminal is interrupted, and the output from the output terminal d and the input to the TGRST terminal go to "L" level.

Thereafter, when a proper signal is input to the INTG terminal at time $T_{17}$, a light emission stop signal is output from the STP terminal by the same operations as those described above with reference to FIG. 5, and the light emission start signal is then stopped.

The light emission stop signal is output for a predetermined period of time, and thereafter, it is stopped (time $T_{20}$).

Since the trigger capacitor 137 is quickly charged by a light emission current via the light emission tube 134 when the collector-emitter path of the IGBT 132 is disabled, a trigger voltage can be reliably applied to the light emission tube 134 even when light emission is repetitively executed at high speed.

In this embodiment, since the input of a light emission stop signal is inhibited for a predetermined time, the light emission stop timing of the light emission tube 134 is delayed. However, such a delay time does not cause an over-exposure state in practice.

FIG. 4B shows a semiconductor element ESC (Emitter Shorted Collector) 138 as a voltage-operated switch element, including a thyristor element and a MOSFET, which are cascade-connected to each other, and are formed on a single chip.

The ESC 138 may replace the IGBT 132 and the diode 133 in the trigger circuit 1300 of this embodiment. More specifically, the anode of the ESC 138 is connected to the light emission tube 134, the gate of the ESC 138 is connected to the resistor 131, and the source of the ESC 138 is connected to the GND terminal. In this case, the operations are the same as those described above with reference to FIGS. 5 and 6.

As described above, according to the present invention, even when a light emission stop signal is output immediately after a light emission start signal is output, the light emission stop signal is inhibited for a predetermined period of time. Also, even when a light emission start signal is output immediately after a light emission stop signal is output, the light emission start signal is inhibited for a predetermined period of time. For this reason, the voltage-operated switch element can be prevented from being destroyed.

What is claimed is:

1. An electronic flashing device comprising:

a booster circuit for boosting a power supply voltage to a predetermined voltage;

a main capacitor charged with a charge via said booster circuit;

a light emission tube for emitting light according to said charge charged on said main capacitor;

a semiconductor element connected in series with said light emission tube, and including a thyristor element and a MOSFET which are cascade-connected to each other and are formed on a single chip;

a trigger circuit for applying a trigger voltage to said light emission tube in response to a light emission start signal;

a gate voltage applying circuit for applying a first voltage to a gate of said semiconductor element before the light emission start signal is output, in response to a second voltage and independent of the light emission start signal; and a gate voltage disappearing circuit for causing the first voltage at the gate of said semiconductor element to disappear in response to a light emission stop signal for causing said light emission tube to stop light emission, wherein a series circuit of said light emission tube and said semiconductor element is connected in parallel with said main capacitor.

2. A device according to claim 1, further comprising:

a base voltage disappearing circuit for causing the second voltage applied to said gate voltage applying circuit to disappear in response to the light emission stop signal.

3. A control circuit for an electronic flashing device, which comprises a booster circuit for boosting a power supply voltage to a predetermined voltage, a main capacitor charged via said booster circuit, a light emission tube for emitting light according to a charge charged on said main capacitor, a voltage-operated element connected in series with said light emission tube, a circuit for applying a voltage to a gate of said voltage-operated element in response to a light emission start signal, and a circuit for causing the voltage at the gate of said semiconductor element to disappear in response to a light emission stop signal, comprising:

a circuit for inhibiting the light emission stop signal for a time interval commencing in response to output of the light emission start signal and terminating after a predetermined delay; and a circuit for inhibiting the light emission start signal for a time interval commencing in response to output of the light emission stop signal and terminating after a predetermined delay.

4. A circuit according to claim 3, wherein said voltage-operated element comprises an insulated gate bipolar transistor.

5. A circuit according to claim 3, wherein said voltage-operated element comprises a semiconductor element including a thyristor element and a MOSFET which are cascade-connected to each other, and are formed on a single chip.

* * * * *